United States Patent
Zhang

(10) Patent No.: US 10,305,087 B2
(45) Date of Patent: May 28, 2019

(54) RECHARGEABLE BATTERY ASSEMBLY AND TERMINAL DEVICE

(71) Applicant: GUANGDONG OPPO MOBILE TELECOMMUNICATIONS CORP., LTD., Dongguan (CN)

(72) Inventor: Jialiang Zhang, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

(21) Appl. No.: 15/615,042

(22) Filed: Jun. 6, 2017

(65) Prior Publication Data

US 2017/0271646 A1  Sep. 21, 2017

Related U.S. Application Data

(63) Continuation of application No. 15/410,474, filed on Jan. 19, 2017, which is a continuation of application No. PCT/CN2016/074906, filed on Feb. 29, 2016.

(30) Foreign Application Priority Data

Mar. 6, 2015 (CN) .......................... 2015 1 0100681

(51) Int. Cl.
*H01M 2/34* (2006.01)
*H01M 10/42* (2006.01)
(Continued)

(52) U.S. Cl.
CPC ......... *H01M 2/348* (2013.01); *H01M 10/425* (2013.01); *H01M 10/486* (2013.01);
(Continued)

(58) Field of Classification Search
CPC ............. H01M 10/425; H01M 10/486; H01M 2200/103; H02J 7/0029; H02J 7/0031; H02H 7/18
See application file for complete search history.

(56) References Cited

U.S. PATENT DOCUMENTS 7,079,003 B2   7/2006  Furuta et al.
7,679,330 B2   3/2010  Furuuchi et al.
(Continued)

FOREIGN PATENT DOCUMENTS

CN   2433729 Y    6/2001
CN   1703814 A   11/2005
(Continued)

OTHER PUBLICATIONS

International Search Report (including English translation) issued in corresponding International Application No. PCT/CN2016/074906, dated May 20, 2016, 4 pages.
(Continued)

*Primary Examiner* — Stephan J Essex
(74) *Attorney, Agent, or Firm* — Young Basile Hanlon & MacFarlane, P.C.

(57) ABSTRACT

A rechargeable battery assembly and a terminal device are provided. The rechargeable battery assembly includes a battery main body which includes a charging interface, a fuse, and a battery cell, the fuse is arranged between the battery cell and the charging interface, and a current input from the charging interface is conducted to the battery cell via the fuse when the battery cell is charged. The rechargeable battery assembly further includes a heater which includes a control element and a heating element, and the control element controls the heating element to release heat to the fuse upon receiving a control signal. The rechargeable battery assembly further includes a sensor configured to detect the current parameter of the battery cell, and a
(Continued)

processor configured to acquire the parameter from the sensor, and transmit the control signal to the control element when it is determined that the parameter satisfies a preset condition.

12 Claims, 2 Drawing Sheets

(51) Int. Cl.
    *H01M 10/48* (2006.01)
    *H02H 7/18* (2006.01)
    *H02J 7/00* (2006.01)
    *H02H 3/20* (2006.01)
    *H02H 5/04* (2006.01)

(52) U.S. Cl.
    CPC ............... *H02H 7/18* (2013.01); *H02J 7/00* (2013.01); *H02J 7/0029* (2013.01); *H01M 2200/103* (2013.01); *H02H 3/202* (2013.01); *H02H 5/04* (2013.01); *H02J 2007/0037* (2013.01)

(56) References Cited

U.S. PATENT DOCUMENTS

| | | | |
|---|---|---|---|
| 8,659,267 | B2 | 2/2014 | Yun |
| 8,890,483 | B2 | 11/2014 | Nakatsuji et al. |
| 2005/0225421 | A1 | 10/2005 | Furuta et al. |
| 2007/0188148 | A1 | 8/2007 | Kawasumi et al. |
| 2013/0323548 | A1* | 12/2013 | Iwamoto ............ H01M 2/348 429/62 |
| 2014/0329113 | A1* | 11/2014 | Han ............ H05B 1/0236 429/7 |
| 2015/0303011 | A1 | 10/2015 | Jung et al. |

FOREIGN PATENT DOCUMENTS

| | | |
|---|---|---|
| CN | 201821092 U | 5/2011 |
| CN | 104377754 A | 2/2015 |
| CN | 204559157 U | 8/2015 |
| CN | 104935024 A | 9/2015 |
| JP | H08205411 A | 8/1996 |
| WO | 2014081234 A1 | 5/2014 |

OTHER PUBLICATIONS

Office Action (including English translation) issued in corresponding Chinese Patent Application No. 201510100681.3, dated Aug. 4, 2016, 5 pages.

Extended European search report issued in corresponding European application No. 16761040.1 dated Mar. 12, 2018.

* cited by examiner

RECHARGEABLE BATTERY ASSEMBLY AND TERMINAL DEVICE

CROSS REFERENCE TO RELATED APPLICATIONS

This application is a continuation application of U.S. application Ser. No. 15/410,474, filed on Jan. 19, 2017, which is the U.S. continuation application of PCT/CN2016/074906, filed on Feb. 29, 2016, which claims priority to Chinese Patent Application No. 201510100681.3, filed on Mar. 6, 2015, contents of all of which are hereby incorporated by reference in their entireties.

TECHNICAL FIELD

The present disclosure relates to charging field, and more particularly, to a rechargeable battery assembly and a terminal device equipped with the rechargeable battery assembly.

BACKGROUND

For a rechargeable battery having a fuse protection function, by arranging a fuse between a charging interface and a battery cell, when a charging current is too great, a charging circuit can be cut off by fusing of the fuse. Therefore, damage and burst of the battery caused by the great charging current can be avoided.

However, the fusing of the fuse takes a certain time and may be greatly affected by environment. For example, at a low temperature, even if the current increases, the fusing of the fuse cannot be speeded up. Under this condition, protection of the battery cannot be ensured, and use safety is greatly affected.

SUMMARY

The embodiments of the present disclosure provide a rechargeable battery assembly and a terminal device.

In a first aspect, a rechargeable battery assembly is provided. The rechargeable battery assembly may include a battery main body which comprises a charging interface, a fuse, and a battery cell, wherein the fuse is arranged between the battery cell and the charging interface, and a current input from the charging interface is conducted to the battery cell via the fuse when the battery cell is charged. The rechargeable battery assembly further comprises a heater which comprises a control element and a heating element, wherein the control element controls the heating element to release heat to the fuse upon receiving a control signal. The rechargeable battery assembly further comprises a sensor configured to detect at least one of following parameters: a voltage of the battery cell and a temperature of the battery cell, and a processor configured to acquire the parameter from the sensor, and transmit the control signal to the control element when it is determined that the parameter satisfies a preset condition.

In a second aspect, a terminal device is provided. The terminal device may include a charging interface configured to input a current; a battery cell; a fuse electrically coupling the charging interface to the battery cell; a heater comprising a control element and a heating element, wherein the control element controls the heating element to release heat to the fuse when a voltage of the battery cell reaches a preset voltage threshold or a temperature of the battery cell reaches a preset temperature threshold.

For the rechargeable battery assembly and the terminal device of the embodiment of the present disclosure, the heater having the heating element is included, and the heating element is arranged to be adjacent to the fuse, the sensor detects the voltage or temperature of the battery cell, and the heating element is controlled to release heat when the voltage or temperature of the battery cell satisfies the preset condition, thus the fusing of the fuse can be speeded up, and the use safety can be improved.

BRIEF DESCRIPTION OF THE DRAWINGS

To better illustrate the technical solution of embodiments of the present disclosure, the following descriptions will briefly illustrate the accompanying drawings described in the embodiments. Obviously, the following described accompanying drawings are some embodiments of the present disclosure. Those skilled in the art can obtain other accompanying drawings according to the described accompanying drawings without creative work.

DETAILED DESCRIPTION

The technical solution of embodiments of the present disclosure will be described clearly and completely in combination with the accompanying drawings of the embodiments of the present disclosure. Obviously, the described embodiments are a part of embodiments of the present disclosure, and not all of the embodiments. According to the embodiments of the present disclosure, other embodiments obtained by those skilled in the art without creative work all fall within the protection scope of the present disclosure.

Figure 1:
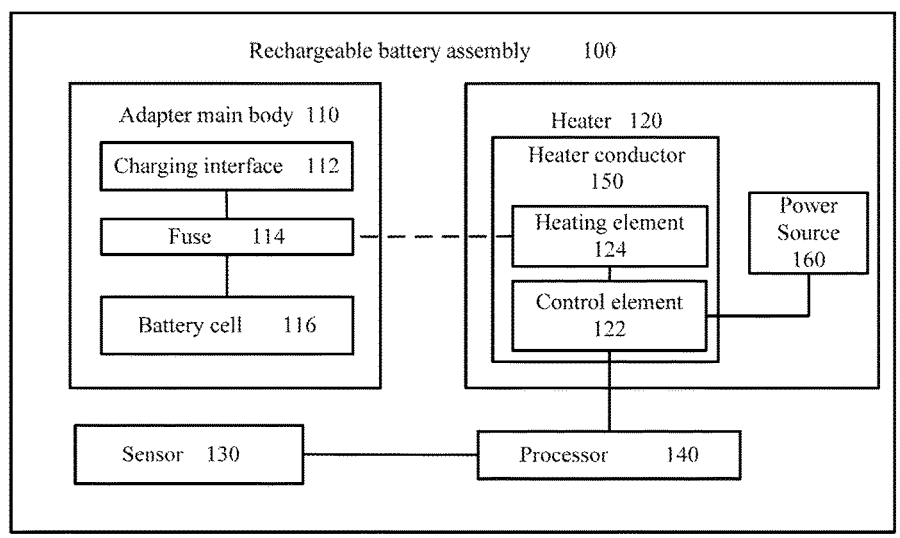
FIG. 1 is a diagrammatic view of a rechargeable battery assembly in accordance with an embodiment of the present disclosure.

FIG. 1 is a diagrammatic view of a rechargeable battery assembly 100 in accordance with an embodiment of the present disclosure. As illustrated by FIG. 1, the rechargeable battery assembly 100 includes a battery main body 110, a heater 120, a sensor 130, and a processor 140.

A battery main body 110 includes a charging interface 112, a fuse 114, and a battery cell 116. The fuse 114 is arranged between the battery cell 116 and the charging interface 112, and a current input from the charging interface 112 is conducted to the battery cell 116 via the fuse 114 when the battery cell 116 is charged.

A heater 120 includes a control element 122 and a heating element 124. The control element 122 controls the heating element 124 to release heat to the fuse 114 upon receiving a control signal.

A sensor 130 detects at least one of following parameters: a voltage of the battery cell 116 and a temperature of the battery cell 116.

A processor 140 acquires the parameter from the sensor 130, and transmits the control signal to the control element 122 when it is determined that the parameter satisfies a preset condition.

The following will specifically illustrate the elements of the rechargeable battery assembly 100.

A. Battery Main Body 110.

The battery main body 110 includes the charging interface 112, the fuse 114, and the battery cell 116.

In an embodiment of the present disclosure, the charging interface 112 can include a positive port (illustrated by FIG.

Figure 2:
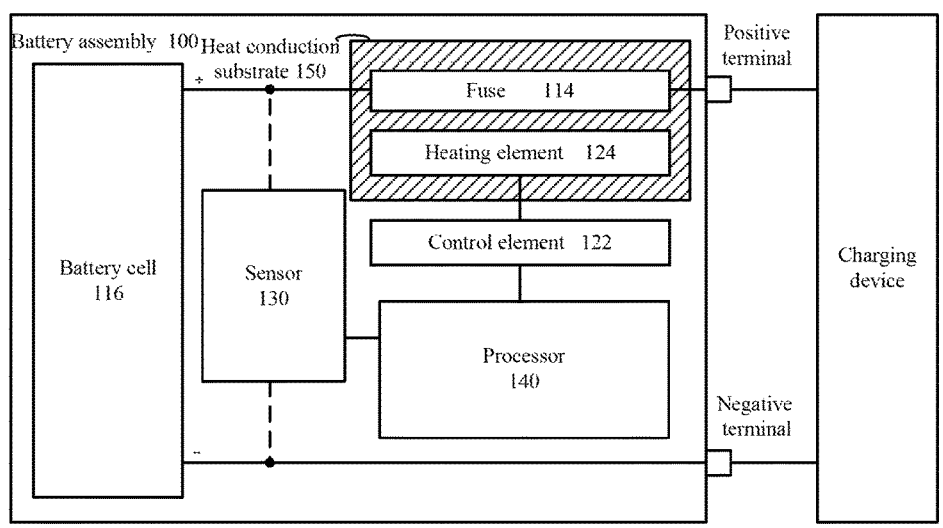
FIG. 2 is a schematic circuit diagram of a rechargeable battery assembly in accordance with an embodiment of the present disclosure.

2) and a negative port (illustrated by FIG. 2). For a current transmission path, the battery cell 116 is arranged between the positive port and the negative port. By coupling a positive output port of a charging circuit (for example, the charging circuit of the power adapter) to the positive port, and by coupling a grounding terminal of the charging circuit to the negative port, a charging loop is formed to charge the battery cell 116.

In an embodiment of the present disclosure, the fuse 114 can be arranged between the positive port and the battery cell 116. Therefore, the current input from the positive port flows to the battery cell 116 via the fuse 114. The fuse 114 has a certain resistance. When the current input from the positive port flows to the fuse 114, heat can be generated due to heating effect of the fuse 114. Furthermore, when the current is great enough, a fusing point of the fuse 114 reaches due to the heat generated by the fuse 114, the fuse 114 is blown out, thus, the charging circuit for charging the battery cell 116 can be cut off.

Therefore, by selecting a fuse 114 made of a proper material based on a specification of the battery cell 116 (for example, a maximum charging current allowed by the battery cell 116), overcharge protection for the battery cell 116 can be realized.

It can be understood that the above structure of the battery main body 110 is just an illustrative example, and the present disclosure is not limited to this. Other rechargeable batteries having the fuse protection mechanism all fall within the protection scope of the present disclosure.

B. Heater 120

The heater 120 includes the control element 122 and the heating element 124.

In an embodiment of the present disclosure, the heating element 124 can release heat to the fuse 114 under the control of the control element 122.

Optionally, the heating element 124 converts electricity into heat.

Specifically, in an embodiment of the present disclosure, the heating element 124 can be a resistor, or other electronic component. Thus, when the current flows to the heating element 124, the heating element 124 can generate heat due to the heating effect of the heating element 124.

When an electronic component is selected as the heating element 124, the control element 122 can be an element for controlling supply of power of the electronic component.

For example, optionally, the control signal is an electrical signal. The control element 122 can be any of following switches: a relay switch, a metal oxide semiconductor field effect transistor (MOSFET) switch, and a transistor switch.

Specifically, for example, the control element 122 can be a normally open relay switch, the MOSFET switch, or the transistor switch. That is, when no electrical signal (for example, a high level signal) is input, the electronic switch used as the control element 122 is in an open state, that is, the circuit for supplying power to the heating element 122 is in an open state. When the control element 122 receives an electric signal, the electronic switch is switched to a closed state, and the circuit for supplying power to the heating element 124 is turned on, thus the heating element 124 can receive the current and release heat.

It can be understood that the above illustrated control element 122 is just an illustrative example, and the present disclosure is not limited to this. For example, the control element 122 can further receive a signaling (for example, a digital signal) and recognize the signaling. When it is determined that the signaling indicates that the circuit for supplying power to the heating element 124 needs to be turned on, a corresponding operation is executed to cause the heating element 124 to receive the current and release heat.

In an embodiment of the present disclosure, the heating element 124 is thermally coupled to the fuse 114. That is, the heat released by the heating element 124 can be conducted to the fuse 114 via a heat conductive medium.

Optionally, the heating element 124 is arranged to be adjacent to the fuse 114, so as to cause the heat released by the heating element 124 to be conducted to the fuse 114.

Specifically, the air can be used as the heat conductive medium to conduct heat. That is, by arranging the heating element 124 and the fuse 114 to be close to each other enough, the heat released by the heating element 124 can be conducted to the fuse 114 via the air.

The heating element 124 can also be set to be attached to the fuse 114, thus efficiency of heat conduction can be further improved.

Optionally, the rechargeable battery assembly 100 further includes a heater conductor 150. The heating element 124 is coupled to the fuse 114 via the heat conductor 150, so as to cause the heat released by the heating element to be conducted to the fuse 114 via the heat conductor.

Specifically, the heat conductor 150 can be arranged between the heating element 124 and the fuse 114, and heat conduction occurs between the heating element 124 and the fuse 114 via the heat conductor 150.

Optionally, the heat conductor 150 is a heat conductive substrate having the heating element 124 and the fuse 114 arranged thereon.

Specifically, in an embodiment of the present disclosure, the heating element 124 and the fuse 114 can be arranged on the substrate constructed by copper foil or a printed circuit board (PCB). Therefore, by means of the substrate, the heat conduction can occur between the heating element 124 and the fuse 114.

What needs to be illustrated is that in FIG. 1, a dotted line arranged between the heating element 124 and the fuse 114 indicates thermal coupling between the heating element 124 and the fuse 114. That is, the heating element 124 can be physically coupled to the fuse 114, and the heat conduction can also occur between the heating element 124 and the fuse 114 via the air, and the present disclosure is not limited to these.

Optionally, the heating element 124 is electrically coupled to the charging interface 112 to acquire electricity from the battery cell 116.

Specifically, the heating element 124 can be coupled to the charging interface 112, thus the battery cell 116 can supply power to the heating element 124.

Optionally, when the rechargeable battery assembly 100 is charged by a power adapter, the heating element 124 is electrically coupled to the power adapter, so as to acquire electricity from the power adapter.

Specifically, the heating element 124 is coupled to an output port of the power adapter. Thus, when the power adapter charges the battery cell 116, the power adapter can supply power to the heating element 124.

It can be understood that the above method for supplying power to the heating element 124 is just an illustrative embodiment, and the present disclosure is not limited to this. An independent power source 160 for supplying power to the heating element 124 can also be set. The power source 160 is electrically coupled to the heating element 124 via the control element 122 to supply power to the heating element 124. The control element 122 is configured to couple the power source 160 to the heating element 124 upon receiving the control signal.

Furthermore, the above heating element 124 is just an illustrative example, and the present disclosure is not limited to this. For example, the heating element 124 can also be an element for converting chemical energy into heat.

C. Sensor 130

In an embodiment of the present disclosure, a voltmeter can be used as the sensor 130. Under this condition, the voltmeter can be arranged between the positive port and the negative port of the charging interface 112. That is, the voltmeter is coupled to the battery cell 116 in parallel. Therefore, the voltmeter can detect the voltage of the battery cell 116 in real time, and the detected voltage is a parameter used by the processor 140.

In an embodiment of the present disclosure, a thermometer can also be used as the sensor 130. Under this condition, the thermometer can be arranged to be adjacent to the battery cell 116. Therefore, the thermometer can detect the temperature of the battery cell 116, and the temperature is a parameter used by the processor 140.

What needs to be illustrated is that in an embodiment of the present disclosure, any of the voltmeter and the thermometer can be used as the sensor 130, both of the voltmeter and the thermometer can also be used as the sensor 130, and the present disclosure is not limited to these.

D. Processor 140

In at least one embodiment of the present disclosure, the processor 140 communicates with the sensor 130, thus the processor 140 can acquire the parameter detected by the sensor 130, and determine whether to transmit the control signal to the control element 122 according to the parameter, so as to cause the heating element 124 to release heat to the fuse 114.

Optionally, when the parameter includes the temperature of the battery cell 116, the processor 140 transmits the control signal to the heater 120 when it is determined that the temperature of the battery cell 116 is greater than or equal to a preset temperature threshold.

Specifically, when the thermometer is used as the sensor 130, the parameter is the temperature of the battery cell 116.

Correspondingly, the temperature threshold can be stored beforehand. Thus, when the processor 140 determines that the temperature of the battery cell 116 is greater than or equal to the temperature threshold, the processor 140 determines that the battery cell 116 is in an unsafe state, and accordingly transmits the control signal to the control element 122 to cause the heating element 124 to release heat to the fuse 114.

The reason of causing the battery cell 116 to be in the unsafe state may be that the charging current or charging voltage is too great, and may also be that a short occurs in the charging circuit, and may also be that the charging circuit or the power adapter becomes abnormal, and the present disclosure is not limited to these.

In an embodiment of the present disclosure, the temperature threshold can be determined according to the specification of the battery cell 116, for example, a safe temperature (or a highest temperature under a normal use condition).

For example, the temperature threshold can be set according to material of the battery cell 116. For example, when the battery cell 116 is made of lithium material, the temperature threshold can be set to be 45°, for example.

It can be understood that the above specific value of the temperature threshold is just an illustrative example, and the present disclosure is not limited to this.

Optionally, when the parameter includes the voltage of the battery cell 116, the processor 140 transmits the control signal to the heater 120 when it is determined that the voltage of the battery cell 116 is greater than or equal to a preset voltage threshold.

Specifically, when the voltmeter is used as the sensor 130, the parameter is the voltage of the battery cell 116.

Correspondingly, the voltage threshold can be stored beforehand. Thus, when the processor 140 determines that the voltage of the battery cell 116 is greater than or equal to the voltage threshold, the processor 140 determines that the battery cell 116 is in the unsafe state, and accordingly transmits the control signal to the control element 122 to cause the heating element 124 to release heat.

The reason of causing the battery cell 116 to be in the unsafe state may be that the charging current or charging voltage is too great, and may also be that a short occurs in the charging circuit, and may also be that the charging circuit or the power adapter becomes abnormal, and the present disclosure is not limited to these.

In an embodiment of the present disclosure, the voltage threshold can be determined according to the specification of the battery cell 116, for example, a safe voltage (or a highest voltage under a normal use condition).

For example, the voltage threshold can be set according to the safe voltage of the battery cell 116, for example, the voltage threshold can be set to be 4.35V.

It can be understood that the above specific value of the voltage threshold is just an illustrative example, and the present disclosure is not limited to this.

FIG. 2 is a schematic view illustrating coupling relationship of various elements of the rechargeable battery assembly in accordance with an embodiment of the present disclosure. As illustrated by FIG. 2, the battery cell 116 can include an anode (that is, "+" of FIG. 2) and a cathode (that is, "−" of FIG. 2). The anode of the battery cell 116 is coupled to the positive port of the charging interface 112, and the cathode of the battery cell 116 is coupled to the negative port of the charging interface 112. The positive port can be coupled to an anode of a charging device, and the negative port can be coupled to a grounding terminal of the charging device, such that a charging loop for charging the battery cell 116 is constructed.

The fuse 114 is arranged between the anode of the battery cell 116 and the positive port of the charging interface 112, thus, when the fuse is blown out, the charging circuit for charging the battery cell 116 can be cut off.

What needs to be illustrated is that the above setting of the fuse 114 is just an illustrative example, and the present disclosure is not limited to this. For example, the fuse 114 can be arranged between the cathode of the battery cell 116 and the negative port of the charging interface 112.

The voltage detection circuit can be used as the sensor 130, thus the sensor 130 can be arranged between the anode and cathode of the battery cell 116 to detect the voltage of the battery cell 116.

The thermometer can also be used as the sensor 130. The thermometer can be attached to the battery cell 116 to detect the temperature of the battery cell 116, and the thermometer and the battery cell 116 can also be spaced by a specified interval to detect the temperature of the battery cell 116.

The processor 140 can communicate with the sensor 130 to acquire data from the sensor 130, and direct the control element 124 to control the heating element 122 to release heat based on the data.

The heating element 122 and the fuse 124 can be arranged on the heat conductive substrate, thus the heat released by the heating element 122 can be conducted to the fuse 114 via the heat conductive substrate.

For the rechargeable battery assembly of the embodiment of the present disclosure, the heater having the heating element is included, the heating element is arranged to be adjacent to the fuse, the sensor detects the voltage or temperature of the battery cell, and the heating element is controlled to release heat when the voltage or temperature of the battery cell satisfies the preset condition, thus the fusing of the fuse can be speeded up, and use safety can be improved.

The rechargeable battery cell 100 described in the embodiment of the present disclosure can be used in a terminal device. In the embodiment of the present disclosure, the terminal device can be a terminal which has a battery and can acquire current from an external device to charge the battery, for example, the terminal device can be a mobile phone, a tablet computer, a computing device, an information display device, or other.

Take a mobile phone for an example, the following will illustrate the terminal device of the present disclosure. In an embodiment of the present disclosure, the mobile phone can include a radio frequency circuit, a memory, an input unit, a wireless fidelity (WIFI) module, a display unit, a sensor, an audio circuit, a processor, a projecting unit, a photographing unit, a battery, and so on.

The radio frequency circuit can receive and transmit signals during a process of receiving and transmitting information or during a call. Particularly, after receiving downlink information from a base station, the radio frequency unit transmits the downlink information to the processor. In addition, the radio frequency circuit transmits uplink data to the base station. Generally, the radio frequency circuit includes but not limited to an antenna, at least one amplifier, a transceiver, a coupler, a low noise amplifier, a duplexer, and so on. In addition, the radio frequency circuit can further communicate with other devices via wireless communication and network. The wireless communication can use any communication standard or protocol, includes but not limited to global system for mobile communication (GSM), general packet radio service (GPRS), code division multiple access (CDMA), wideband code division multiple access (WCDMA), long terminal evolution (LTE), E-mail, short messaging service (SMS), and so on.

The memory can store software programs and modules. The processor runs the software programs and the modules stored in the processor to execute various functions and data processing of the mobile phone. The memory mainly includes a program storage partition and a data storage partition. The program storage partition can store an operating system, application programs needed by at least one function (for example, sound playing function, image playing function, and so on), and so on. The data storage partition can store data (for example, audio data, address book, and so on) established during use of the mobile phone, and so on. Additionally, the memory can include a high speed random access memory, and can also include a nonvolatile memory, for example, at least one a disc memory, a flash memory, or other volatile solid state memory.

The input unit can receive input numbers or character information, and generate button signals relating to user settings and function control of the mobile phone. Specifically, the input unit can include a touch panel and other input devices. The touch panel, also named as a touch screen, can detect user touch operations performed on the touch panel or performed on a position near the touch panel (for example, operations performed on the touch panel or on a position near the touch panel by using a finger, a stylus, or any proper object or accessory), and drive a corresponding connecting device according to a preset program driver. Optionally, the touch panel can include a touch detection device and a touch controller. The touch detection device detects touch orientation of the user, detects signals generated by touch operations, and transmits the signals to the touch controller. The touch controller receives touch information from the touch detection device, converts the touch information into touch coordinates, transmits the touch coordinates to the processor, and receives and executes instructions from the processor. Additionally, the touch panel may be a resistive touch panel, a capacitive touch panel, an infrared touch panel, or a surface acoustic wave touch panel. Besides the touch panel, the input unit can further include other input devices. Specifically, the other input devices can include but not limited to one or more of a physical keyboard, functional buttons (for example, a volume control button, a switch button, and so on), a trackball, a mouse, a joystick, and so on.

The display unit can display information input by the user or information provided to the user, and various menus of the mobile terminal. The display unit can include a display panel. Optionally, the display unit may be a liquid crystal display (LCD), an organic light-emitting diode (OLED), or other. Furthermore, the touch panel can cover the display panel. When the touch panel detects the touch operation performed on the touch panel or on a position near the touch panel, the touch panel transmits the touch operation to the processor. The processor determines a type of the touch event, and displays corresponding visual output on the display panel according to the type of the touch event.

The position of the display panel for displaying visual output which can be recognized by user's eyes is the "display region". The touch panel and the display panel can be used as two independent elements to realize input and output function of the mobile terminal, and the touch panel and the display panel can also be integrated together to realize input and output function of the mobile terminal.

Additionally, the mobile phone can further include at least one sensor, for example, a voltage sensor, a temperature sensor, a posture sensor, a light sensor, and other sensors.

Specifically, the posture sensor can be named as a motion sensor. Furthermore, a gravity sensor can be used as an example to illustrate the motion sensor. The gravity sensor can employ an elastic sensitive element to make a cantilever displacer, and employ an energy storage spring made by the elastic sensitive element to drive an electrical touch point, so as to realize a conversion from the gravity into electrical signals.

An accelerometer sensor can be used as another example to illustrate the motion sensor. The accelerometer can detect acceleration of different orientations (generally, three axes), and detect the magnitude and direction of the gravity when in a static state, recognize applications of postures of the mobile phone (for example, screen size switching, related games, magnetometer posture verification), vibration recognition related functions (for example, pedometer, tapping), and so on.

In an embodiment of the present disclosure, the above illustrated motion sensor can be used as a "posture parameter" element described hereinafter, and the present disclosure is not limited to this, other sensors which can acquire "posture parameters" all fall within the protection scope of the present disclosure, for example, a gyroscope. Furthermore, the work principle and data processing of the gyroscope can be similar to that of the present technology, which will not be specifically illustrated herein to avoid repetition.

Additionally, in an embodiment of the present disclosure, a barometer, a hygrometer, a thermometer, and other sensors can be used as the sensor, which will not be repeated herein.

The light sensor can include an environment light sensor and a proximity sensor. The environment light sensor can adjust the lightness of the display panel according to the environment light. The proximity sensor can turn off the display panel and/or backlight when the mobile phone is moved to an ear.

An audio circuit, a loudspeaker, and a microphone can be used as the audio interface of the mobile phone. The audio circuit can convert received audio data into electrical signals, transmit the electrical signals into the loudspeaker, and the loudspeaker outputs the electrical signals. In another aspect, the microphone converts collected sound signals into electrical signals, the audio circuit converts the electrical signals into audio data, and outputs the audio data to the processor. After processing, the processor transmits the audio data to another mobile phone via the radio frequency circuit, or transmits the audio data to the memory for further processing.

WiFi belongs to short distance wireless transmission technology. The mobile phone can receive and transmit E-mails, browse webpage, access streaming media, and so on via the WiFi module. The WiFi module provides wireless broadband internet access. It can be understood that the WiFi module is not necessary for the mobile phone, and without changing the essence of the present disclosure, the WiFi module can be omitted according to needs.

The processor is a control center of the mobile phone, and is coupled to various elements of the mobile phones via various interfaces and lines. The processor runs or executes software applications and/or modules stored in the memory and invokes the data stored in the memory to execute various functions and data processing of the mobile phone, so as to monitor the mobile phone. Optionally, the processor can include one or more processing units. Preferably, the processor can include an application processor and a modulation-demodulation processor. The application processor mainly processes the operating system, user interfaces, and application programs. The modulation-demodulation processor mainly processes wireless communication.

It can be understood that the modulation-demodulation processor may not be integrated into the processor.

Furthermore, the processor can be used as the processor 160 to execute functions same or similar to that executed by the processing unit.

The mobile phone further includes a power source (for example, a battery) to supply power to various elements.

Preferably, the power source can be logically coupled to the processor via a power source management system, so as to realize charging management function, discharging management function, power consumption management function via the power source management system. The mobile phone can further include a Bluetooth module even if it is not shown, which will not be repeated herein.

What needs to be illustrated is that the mobile phone is just an example to illustrate the terminal device, and the present disclosure is not limited to this. The present disclosure can be applied to a mobile phone, a tablet computer, and so on, and the present disclosure is not limited to this.

In embodiments of the present disclosure, it can be understood that the units illustrated as separate units can be or cannot be physically separated, and components illustrated by units can be or cannot be physical units, that is, can be in a place, or can be distributed in several network units.

A part of or all of the units can be selected according to actual need to realize the purpose of the solution of the embodiments.

The present disclosure may include dedicated hardware implementations such as application specific integrated circuits, programmable logic arrays and other hardware devices. The hardware implementations can be constructed to implement one or more of the methods disclosed herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "unit," or "sub-unit" may include memory (shared, dedicated, or group) that stores code or instructions that can be executed by one or more processors.

The foregoing descriptions are merely preferred embodiments of the present disclosure, rather than limiting the present disclosure. Any one skilled in the art can easily make change or alterations within the technology range of the present disclosure, and those change or alterations shall fall within the protection scope of the present disclosure. Therefore, the protection scope of the present disclosure shall be limited by the protection scope of the claims.

What is claimed is:

1. A rechargeable battery assembly, comprising:
a battery main body comprising a charging interface, a fuse, and a battery cell, wherein the fuse is arranged between the battery cell and the charging interface, and a current input from the charging interface is conducted to the battery cell via the fuse, the material of the fuse is selected based on a maximum charging current allowed by the fuse, wherein the fuse is capable of being blown out when a current flowing through the fuse is great enough to reach a fusing point of the fuse due to the heat generated by the fuse;
a heater comprising a control element and a heating element, wherein the control element is configured to control the heating element to release heat upon receiving a control signal;
a sensor configured to detect at least one of the following parameters: a voltage of the battery cell and a temperature of the battery cell;
a processor configured to acquire the parameter from the sensor, and transmit the control signal to the control element when it is determined that the parameter satisfies a preset condition;
wherein, the heating element is configured to convert electricity into heat;
the heater further comprises:
an independent power source electrically coupled to the heating element via the control element; and
the control element is configured to switch on a circuit between the independent power source and the heating element upon receiving the control signal, thus to enable the independent power source to supply electricity to the heating element and to cause the heating element to release heat,
wherein the heating element is coupled to the fuse via a heat conductor, so as to cause the heat released by the heating element to be conducted to the fuse via the heat conductor, the heat conductor is a heat conductive substrate having the heating element and the fuse arranged thereon and is configured to conduct the heat released by the heating element to the fuse, and the heat conductive substrate is a printed circuit board.

2. The rechargeable battery assembly of claim 1, wherein the control signal is an electrical signal, and the control element is any one of following switches: a relay switch, a metal oxide semiconductor field effect transistor (MOSFET) switch, and a transistor switch.

3. The rechargeable battery assembly of claim 1, wherein the heating element is electrically coupled to the charging interface, so as to acquire electricity from the battery cell.

4. The rechargeable battery assembly of claim 1, wherein when the rechargeable battery assembly is charged by a power adapter, the heating element is electrically coupled to the power adapter to acquire electricity from the power adapter.

5. The rechargeable battery assembly of claim 1, wherein when the parameter comprises the temperature of the battery cell, the processor is configured to transmit the control signal to the heater when it is determined that the temperature of the battery cell is greater than or equal to a preset temperature threshold.

6. The rechargeable battery of claim 1, wherein when the parameter comprises the voltage of the battery cell, the processor is configured to transmit the control signal to the heater when it is determined that the voltage of the battery cell is greater than or equal to a preset voltage threshold.

7. A terminal device, comprising:
a rechargeable battery assembly comprising:
a battery main body comprising a charging interface, a fuse, and a battery cell, wherein the fuse is arranged between the battery cell and the charging interface, and a current input from the charging interface is conducted to the battery cell via the fuse, the material of the fuse is selected based on a maximum charging current allowed by the fuse, wherein the fuse is capable of being blown out when a current flowing through the fuse is great enough to reach a fusing point of the fuse due to the heat generated by the fuse;
a heater comprising a control element and a heating element, wherein the control element is configured to control the heating element to release heat upon receiving a control signal;
a sensor configured to detect at least one of following parameters: a voltage of the battery cell and a temperature of the battery cell;
a processor configured to acquire the parameter from the sensor, and transmit the control signal to the control element when it is determined that the parameter satisfies a preset condition;
wherein, the heating element is configured to convert electricity into heat;
the heater further comprises:
an independent power source electrically coupled to the heating element via the control element; and
the control element is configured to switch on a circuit between the independent power source and the heating element upon receiving the control signal, thus to enable the independent power source to supply electricity to the heating element and to cause the heating element to release heat,
wherein the heating element is coupled to the fuse via a heat conductor, so as to cause the heat released by the heating element to be conducted to the fuse via the heat conductor, the heat conductor is heat conductive substrate having the heating element and the fuse arranged thereon and is configured to conduct the heat released by the heating element to the fuse, and the heat conductive substrate is a printed circuit board.

8. The terminal device of claim 7, wherein the control signal is an electrical signal, and the control element is any one of the following switches: a relay switch, a metal oxide semiconductor field effect transistor (MOSFET) switch, and a transistor switch.

9. The terminal device of claim 7, wherein the heating element is electrically coupled to the charging interface, so as to acquire electricity from the battery cell.

10. The terminal device of claim 7, wherein when the rechargeable battery assembly is charged by a power adapter, the heating element is electrically coupled to the power adapter to acquire electricity from the power adapter.

11. The terminal device of claim 7, wherein when the parameter comprises the temperature of the battery cell, the processor is configured to transmit the control signal to the heater when it is determined that the temperature of the battery cell is greater than or equal to a preset temperature threshold.

12. The terminal device of claim 7, wherein when the parameter comprises the voltage of the battery cell, the processor is configured to transmit the control signal to the heater when it is determined that the voltage of the battery cell is greater than or equal to a preset voltage threshold.

* * * * *